(12) United States Patent
Bonekamp et al.

(10) Patent No.: US 12,535,327 B2
(45) Date of Patent: Jan. 27, 2026

(54) METHOD FOR OPTIMIZING THE ENERGY MANAGEMENT OF A FLEET OF ELECTRONIC TRANSPORTATION VEHICLES, MORE PARTICULARLY A FLEET OF ELECTRIC BUSES

(71) Applicant: conneXXion Nederland N.V., Hilversum (NL)

(72) Inventors: Bart Bonekamp, Hilversum (NL); Robèrt Weijers, Hilversum (NL); Anko Wolf, Hilversum (NL); Andrew Luckett, Hilversum (NL)

(73) Assignee: conneXXion Nederland N.V., Hilversum (NL)

( * ) Notice: Subject to any disclaimer, the term of this patent is extended or adjusted under 35 U.S.C. 154(b) by 56 days.

(21) Appl. No.: 18/394,426

(22) Filed: Dec. 22, 2023

(65) Prior Publication Data
US 2024/0210188 A1    Jun. 27, 2024

(30) Foreign Application Priority Data
Dec. 23, 2022    (EP) .................................... 22216353

(51) Int. Cl.
*G01C 21/34*    (2006.01)
*G01C 21/00*    (2006.01)

(52) U.S. Cl.
CPC ..... *G01C 21/3469* (2013.01); *G01C 21/3492* (2013.01); *G01C 21/3874* (2020.08)

(58) Field of Classification Search
CPC ............ G01C 21/3469; G01C 21/3492; G01C 21/3874; G01C 21/3484; G01C 21/3697;
(Continued)

(56) References Cited

U.S. PATENT DOCUMENTS 10,161,759 B2 * 12/2018 Fisher ..................... B60L 53/68
10,859,391 B2 * 12/2020 Beaurepaire ............ B60L 58/12
(Continued)

FOREIGN PATENT DOCUMENTS

GB    2 546 565 A    7/2017

OTHER PUBLICATIONS

Chaitanya Mishra, et al., "Interactive Query Refinement", Extended Database Technology, Mar. 24, 2009, pp. 862-873, XP093046869.
(Continued)

*Primary Examiner* — Logan M Kraft
*Assistant Examiner* — Johnny H Hoang
(74) *Attorney, Agent, or Firm* — Sughrue Mion, PLLC (57) ABSTRACT

Computer-implemented method for optimizing the energy management of a fleet of electric transportation vehicles, more particularly a fleet of electric buses, including for each vehicle of the fleet, before performing each of the said at least one journey of the schedule: acquiring a set of attributes for the upcoming journey; launching a query in a database in order to obtain at least one performance index in function of the attributes; if the query returns at least one performance index, calculating an expected state of charge of the battery at the end of the upcoming journey; comparing the expected state of charge with a predetermined state of charge limit; and if the expected state of charge is lower than said predetermined state of charge limit, deliver a signal on a human-machine interface to signal a potential failure of the upcoming journey.

7 Claims, 3 Drawing Sheets

(58) Field of Classification Search
CPC .. G06F 6/2425; G06Q 10/0635; G06Q 10/04;
G06Q 10/06311; G06Q 10/06312; G06Q
50/40; B60L 58/12; B60L 2240/662;
B60L 2240/66; B60L 2250/16; B60L
2250/18; B60L 2260/54; B60L 2240/62;
B60L 2240/70; B60L 53/00; B60L
2260/52; Y02T 90/14; Y02T 90/16; Y02T
10/72; Y02T 10/7072; G06N 5/022;
G06N 20/00
USPC .......................................................... 701/123
See application file for complete search history.

(56) References Cited

U.S. PATENT DOCUMENTS

| | | | |
|---|---|---|---|
| 12,242,984 B2* | 3/2025 | Bnaya | G08G 1/20 |
| 2017/0010114 A1 | 1/2017 | Fisher et al. | |
| 2019/0226860 A1* | 7/2019 | Fisher | B60L 53/66 |
| 2020/0166356 A1 | 5/2020 | Beaurepaire et al. | |
| 2023/0182580 A1* | 6/2023 | Cronin | H02J 7/345 |
| | | | 307/10.1 |
| 2023/0234592 A1* | 7/2023 | Masquelier | G06Q 50/40 |
| | | | 701/1 |

OTHER PUBLICATIONS

Zheng Xuan Loh, et al., "Adaptive Method for Range Top-k Queries in OLAP Data Cubes", In: Database and Expert Systems Applications, Sep. 2, 2002, pp. 648-657, XP93046823.

Extended European Search Report for counterpart EP 22 21 6353 dated May 16, 2023.

* cited by examiner

METHOD FOR OPTIMIZING THE ENERGY MANAGEMENT OF A FLEET OF ELECTRONIC TRANSPORTATION VEHICLES, MORE PARTICULARLY A FLEET OF ELECTRIC BUSES

BACKGROUND OF THE INVENTION

The invention relates to a method for optimizing the energy management of a fleet of electric transportation vehicles, more particularly a fleet of electric buses.

The transition from diesel busses to a large electric bus fleet has brought new challenges for public transit system operators. Compared to the diesel busses, electric busses have more interdependent variables and consequently the existing methods for the management of combustion engine vehicles cannot be directly transposed to electric vehicles.

Usually, a fleet of vehicles, for instance for public transportation, is operated from a control center where operators take decisions usually involving many manual calculations.

Particularly in an electric fleet environment, the operator deals with many incoming requests from drivers who feared "range" anxiety, while they did not have any insights in the actual performance of the busses on the road. Most of the actions they had to take were involving manual theoretical calculations, from low value, corrective, and comprising administrative measures instead of pro-active, preventive and value added for the driver and for the general organization.

In addition to operational issues, the prior art planning and scheduling process from network design to daily operations is not flexible enough to solve operational challenges, meet drivers wishes and provide efficient concessions to their clients, for instance the public transportation authorities, particularly in a context of a fleet of electric vehicles.

Moreover, the vehicle schedules generated were not accurate enough and they were not able to take into account all the new parameters, associated with electric vehicles, such as battery SoH, energy consumption, charge rate, etc., resulting in too much slack in the schedules, more energy usage, more busses required, more hours from drivers, and a higher $CO_2$ impact.

SUMMARY OF THE INVENTION

We propose a computer-implemented method for optimizing the energy management of a fleet of electric transportation vehicles comprising:
Providing an operation schedule for a given timeframe; said operation schedule comprising for each vehicle a plurality of activities to complete, said plurality of activities comprising at least one journey;
Providing a database of historic data; said historic data being configured to associate at least one performance index, with a plurality of data attributes, for instance with a set of plurality data attributes, in particular at least chosen among a vehicle type, a transportation line, the outside temperature, daytime, driver's performance, day type, connection;
And for each vehicle of the fleet, before performing each of the said at least one journey of the schedule:
Acquiring a set of attributes for the upcoming journey, said set of attributes comprising the same type of attributes, preferably the same, as the set of attributes of the provided historic data;
Converting at least one attributes of the set of attributes into a range of values; said range of values replacing said attribute in the set of attributes acquired;
Launching a query in said database in order to obtain at least one performance index, in particular to obtain the performance index the set of attributes of which matches with the set of attributes containing at least one of converted attributes;
If said query returns at least one performance index, calculating an expected state of charge of the battery at the end of the upcoming journey;
Comparing said expected state of charge with a predetermined state of charge limit; and if said expected state of charge is lower than said predetermined state of charge limit, deliver a signal on a human-machine interface to signal a potential failure of said upcoming journey.

Here the potential failure is the inability to make the next journey due to an insufficient SoC of the vehicle.

This allows to anticipate problems that may arise in the context of operating an electric vehicle fleet, in particular by anticipating low SoC before a journey begins.

Advantageously, said performance index comprises an efficiency value or a couple of values of energy and distance.

Advantageously, the historic data are stored in a datacube.

According to an alternative embodiment of the invention, the performance index can also be a charge rate, but the 'dimensions' of the database, here the cube, would be different, e.g., ambient temperature, battery temp, start SoC, etc.

Advantageously, if the query returns no answer, also called "hit", then the method comprises in a repetitive manner, until the query returns at least one performance index, a step of:
reducing the number of attributes in the set of attributes, according to a predetermined pattern, and
relaunch a query.

Advantageously, after an activity is completed by a vehicle, the database stores the activity distance and the energy consumed during the activity along with the set of attributes calculated before starting the activity.

Advantageously, the computer-implemented method may further comprise a step of recalculating the operation schedule of the fleet of electric transportation vehicles as a function of the expected state of charge of each vehicle of the fleet.

In one embodiment, for each vehicle of the fleet, after the beginning of said at least one journey, the computer-implemented method may reiterate in real time, the following steps:
Acquiring the set of attributes for the rest of the upcoming journey;
Converting at least one attributes of the set of attributes into a range of values; said range of values replacing said attribute in the set of attributes acquired;
Launching a query in said database in order to obtain at least one performance index the set of attributes of which matches with the set of attributes containing at least one of converted attributes;
If said query returns at least one performance index, calculating an expected state of charge of the battery at the end of the upcoming journey;
Comparing said expected state of charge with a predetermined state of charge limit; and if said expected state of charge is lower than said predetermined state of charge limit, deliver a signal on a human-machine interface to signal a potential failure of said rest of the upcoming journey and recalculating the operation schedule of the fleet of electric transportation vehicles as a function of the expected state of charge of each vehicle of the fleet.

The invention also concerns a graphical user interface for optimizing the energy management of a fleet of electric transportation vehicles, said interface comprising a list of vehicles of the electric vehicle fleet, each electric vehicle being associated with a plurality of intended activities;

each vehicle of the list comprising a battery indicator associated with vehicle, characterized in that the battery indicator is formed of an image representing the measured SoC of the battery and colorized in function of the estimated SoC at the end of the next scheduled activity.

This allows the user to intuitively understand the status of the vehicle and to know if the vehicle will be able to complete the planned schedule with a single visual element of information.

Advantageously, said estimated SoC at the end of the next scheduled activity is calculated by the implementation of the method as exposed previously. Such method may also be implemented in real time during a scheduled activity.

BRIEF DESCRIPTION OF THE DRAWINGS

The invention will now be described, by way of a non-limiting example, and in reference to the accompanying drawings, where.

DETAILED DESCRIPTION OF THE INVENTION

The invention relates to a method for optimizing the management of a fleet of electric vehicles; in this embodiment a fleet of electric-buses, also called e-bus.

This method is usually implemented as a software run by a computer.

By the term computer it must be understood that we are referring to any kind of electronic devices, acting alone or together with other computers in a network environment. This computer can be a server, a desktop station, a laptop, a mobile device or any other adapted device.

This software is separated in different modules, also called dashboard, which can be described as different views of the inputs, outputs and parameters of the method according to the invention.

The method logic is therefore employed for decision making and planning tool for the bus drivers, traffic control center employees, depot coordinators, depot manager and concession director and makes use of three different dashboards that visualize the information needed for the specific end-users, monitor and use operational data in real time.

Figure 2:
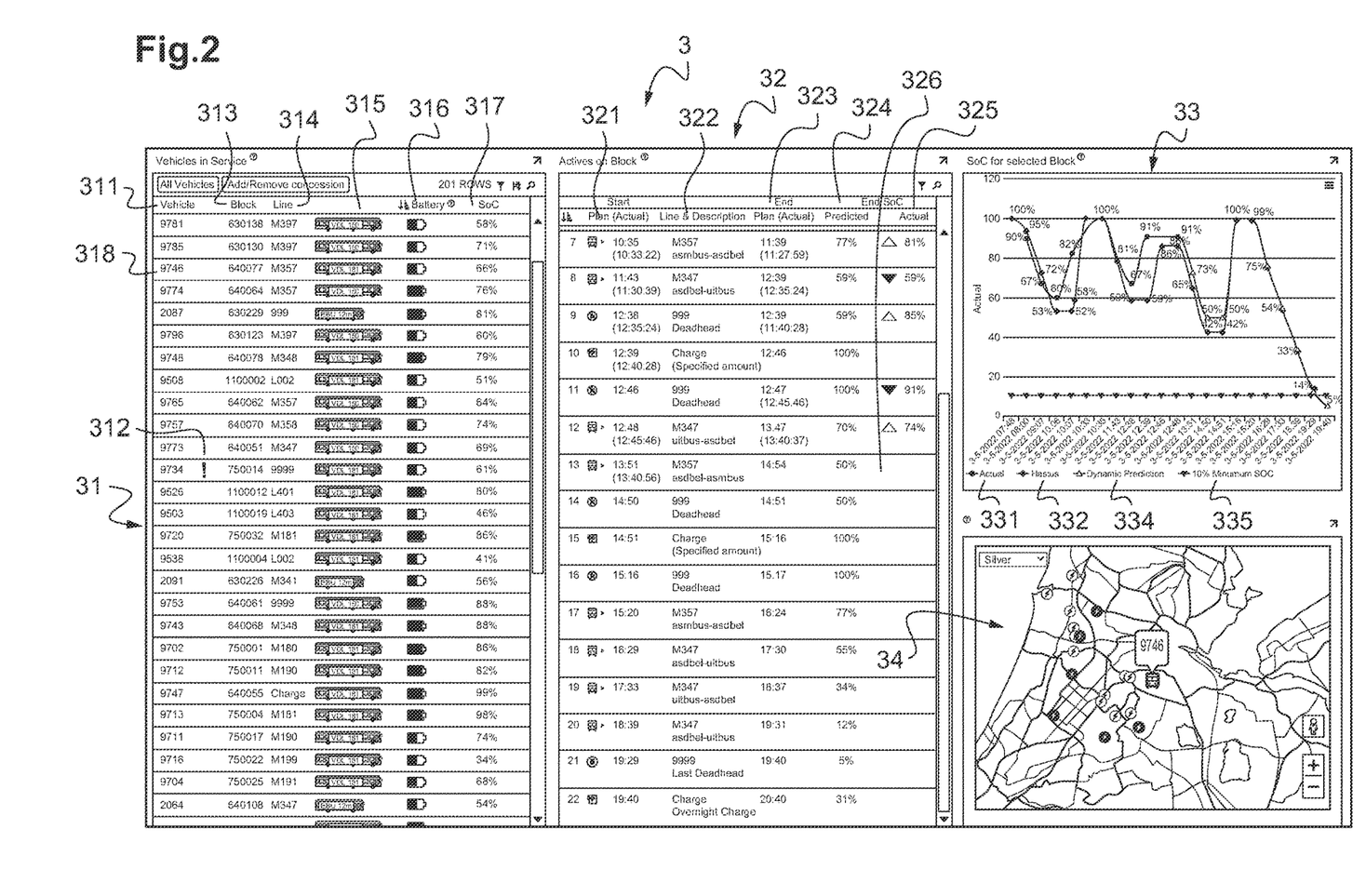
FIG. 2 is a dashboard of a Graphical User Interface implementing the method of the invention.

Among the dashboards, we can cite the departure board, the charger location dashboard, and the vehicle in service dashboard, which is represented in FIG. 2.

A plurality of other dashboards, not described here, can also be implemented in such software.

However, most of the dashboard are depending on a common core running a common optimization logic, here described as the method according to the invention.

This optimization and management method allows to efficiently manage the daily operations of the e-buses, by anticipating the needs and the situations that might be encountered by the drivers, instead of only solving the issues as it was implemented in the prior art solutions.

The general idea of the method according to the invention is to take into consideration a complete set of relevant parameters, in an all-embracing approach.

Furthermore, the logic of the method optimizes operations, from initial scheduling, managing the schedule to real-world execution of the schedule and forecasting for future use, leading to resources economy, to better servicing the passenger community and to lower cost, improving the overall operation.

In the invention, the term "resource" is used to encompass a plurality of managed elements and related data. In other words, a resource is the items we want to manage, comprising but not limited to:

Electric vehicles (size or type of vehicle, charging type)

Batteries of the vehicles (comprising the parameters State of Charge SoC, State of Heath SoH, End-of-Life EOF)

charging stations (size, positioning) and charging plan route descriptions (flat, ascending, descending, frequency of stops, urban or rural environment, average speed etc.)

rate of degradation of the battery;

state of charge SoC when subject to re-charging, considering both depot charging and opportunity charging environmental conditions and their implications (including temperature and the need for heating/cooling, humidity, wind etc.)

driving style (for instance a numeral classification of driver's style, or a categorization of driver's style, as a letter classification)

idle time of the vehicle trips without passengers maintenance of the vehicle incidental or systemic passenger behavior (for instance: Covid influence, energy consumption due to mobile devices charging)

Moreover, a set of rules can be added to the method to take in consideration regulatory compliance safety considerations, and local market conditions.

The parameters of this list of resources can be individually measured, estimated, acquired, or calculated in different ways, for instance measured in real-time.

As an example, the End-of-Life parameter (usually called EOL) and/or the State of Health (SoH) of the battery, can be estimated taking into consideration either the Original Equipment Manufacturer (abbreviated OEM) operating parameters, or, alternatively, implementing a specific model of battery aging.

Vehicle in Service Embodiment

Figure 1:
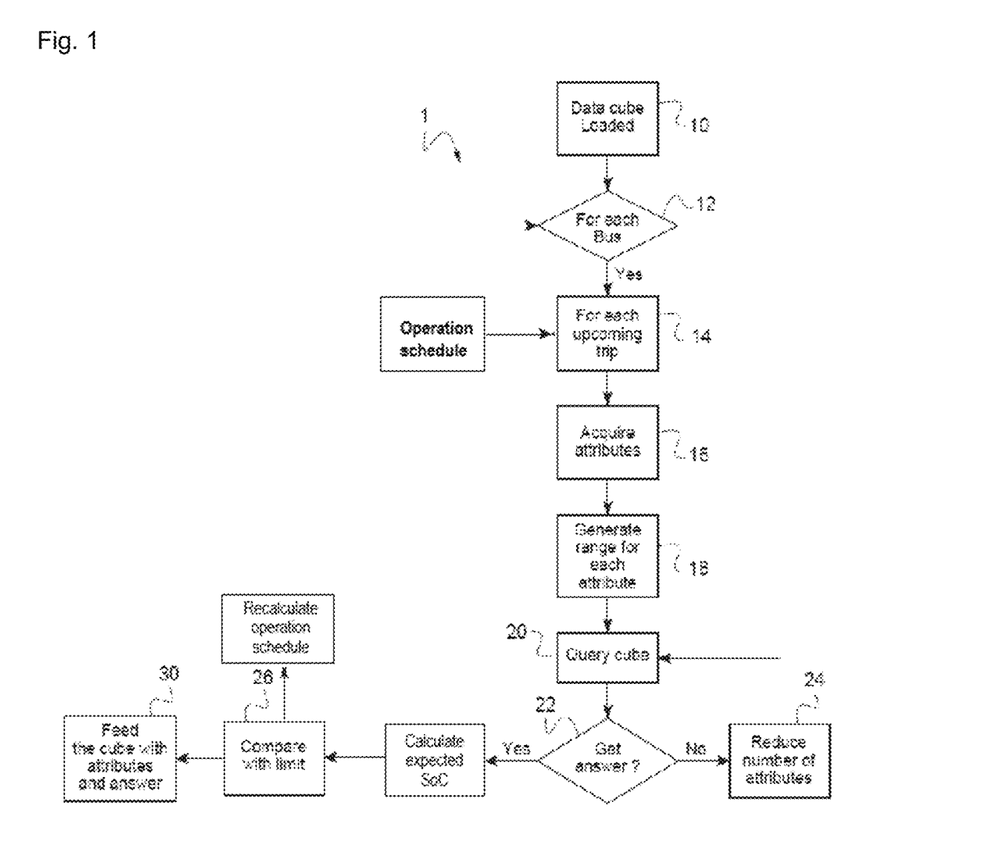
FIG. 1 is a flowchart of the method of the invention.

An embodiment of the computer-implemented method 1 according to the invention, and represented FIG. 2, is described in relation with the dashboard "vehicle in service" 3, according to FIG. 1.

The vehicles in service dashboard 3 includes a first list 31 of vehicles in service, these vehicles belonging to the vehicle fleet.

Each line of the list 31 comprising:

a vehicle identifier 311, a latency indicator 312 displaying an alert, in this case an exclamation mark displayed in red, indicating that the vehicle has not communicated for 5 minutes and that its SoC 317 displayed in real time may be outdated;

a block, also called vehicle task, identifier 313;

the transport line 314 associated with the vehicle; this column can also refer to a deadhead ('9999') or a charge session ("charge");

the vehicle type 315 (e.g., single or articulated bus, and/or equipment reference), a battery indicator 316 according to the invention; and The real-time SoC measurement 317 transmitted by the vehicle.

When a vehicle from the list is selected, for example here the selected vehicle 318, the control panel then includes a detailed list of activities 32 that the vehicle has or is to perform during its schedule.

An activity can correspond to a journey (for example the route of a line), a charging session, a period of inactivity of the vehicle. An activity can also correspond to a portion of a journey, for example between two stops of the vehicle.

A group of activities of a vehicle during a day, according to a schedule, are called a block of the vehicle. A block is therefore made of a succession of activities.

This list of activities 32 includes for each line, from left to right:

an activity number;

a bus icon;

a departure time 321, the description of the activity 322 (line traveled, deadhead, charging session), the arrival time 323.

The activities are displayed in a list in chronological order, the current activity being in bold font and the activities already completed being grayed out.

These already completed activities then include the actual data of the departure time 321 and arrival time 323, as well as an indication of the planned SoC 324 at the end of the activity and the Soc reached 325 at the end of this already completed activity.

Every time a new activity starts, that activity and upcoming activities are replanned, based on, among others, end SoC of previous trip or activity. Therefore, the planned SoC 324 is updated at every activity start.

When the list item is an activity that has not yet been completed, or not started, the start time 321 and finish time 323 are estimated times. The estimated SoC is then calculated according to the method according to the invention, and the actual SoC is then not displayed.

When a block 313 of the first list 31 is selected, for instance the line of the selected vehicle 318, a graph 33 is displayed allowing to visualize the SoC for this activity.

This graph 33 comprises:

an actual graph 331 of the evolution of the SoC up to the point reached in the activity concerned (in particular if the activity is not completed, only the realized portion of the actual SoC is displayed), A first estimation of the SoC 332;

a dynamic prediction of the SoC 334 according to the invention, and

A threshold of SoC 335 at which a green battery turns yellow.

The first estimation of the SoC 332 is for instance an estimation made with a commercial planning software like Hastus® of Giro Inc. This planning is usually done in advance, early in the morning and up to 3-5 days before the planned operations, for instance using an average SoH for Vehicle Type to make it a useful tool.

The selected vehicle is also shown in real time on a map 34 to visualize the route, and charger locations are depicted.

This dashboard takes into account the method according to the invention for estimating the predictive SoC of the bus in service.

Figure 3:
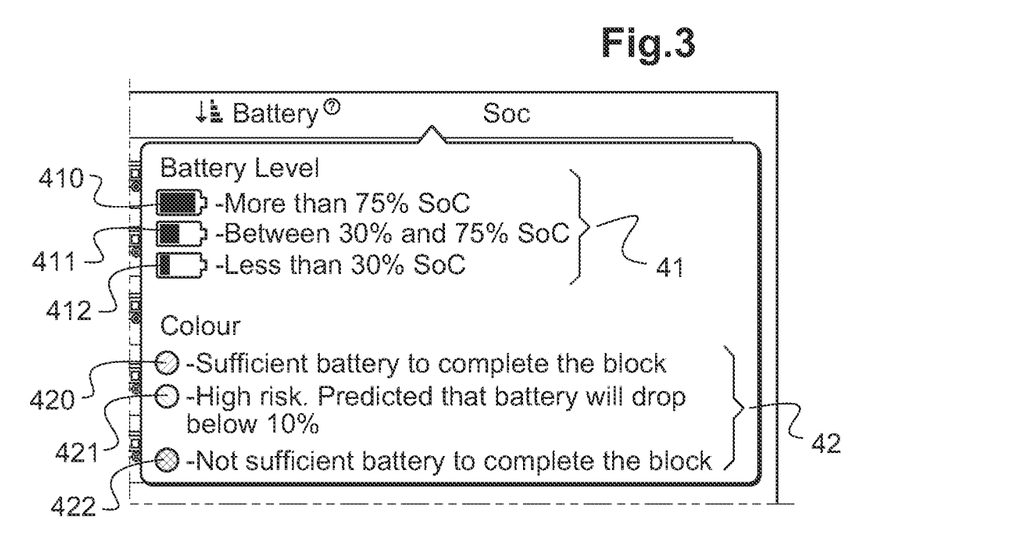
FIG. 3 is a detailed view of the battery indicator according to the invention.

The battery indicator 316 according to the invention is a visual user interface element comprising, on the one hand, a graphic indication and, on the other hand, a color indication enabling the user to identify in an intuitive manner the problems that may be associated with each bus in the list 31.

Indeed, this battery indicator 316 is in the shape of a schematic battery, however this battery incorporates two distinct pieces of information: on the one hand its filling level 41, corresponding to the SoC of the battery, illustrated by the filling of the main shape, and on the other hand a color code, indicating the capacity of the bus to carry out the remainder of the vehicle task (block) considering the SoC."

In order to simplify even more the quick and intuitive interpretation of the user, the SoC charge level is represented according to only three levels:

SoC level above 75% of full capacity 410;

SoC level between 30% and 75% of full capacity 411; and

SoC level below 30% of full capacity 412.

Only three colors 42 are provided:

green 420 indicating that the vehicle includes a battery with sufficient SoC to complete the Activity;

orange 421 indicating that there is a significant risk that the battery will have a level below a predetermined threshold, in this case 10%, or in an alternate embodiment 5%, at the end of the activity;

red 422 indicating that the SoC of the vehicle will not allow the activity to be completed.

This color estimation is based on the following method according to the invention.

Indeed, in the embodiment of the method of the invention, the purpose is to verify that the schedule previously calculated for each bus of the fleet can be made or to alert the operator, or any other person or system concerned, of a potential failed schedule.

Indeed, as the schedule is calculated prior to the operational day, or at least before any operation of a day, conditions may have varied between the scheduling and execution of the schedule. For instance, the weather, the drivers, and the traffic can vary between the moment the schedule was made and when the operations are performed. This impacts the performance and the average usage of the bus.

Usually, a schedule is made to minimize the resource used or needed, where resources can be:

driver hours energy vehicle kilometers battery (in terms of degradation)

chargers, etc.

In particular, a schedule is made to reduce at least the duration of charge sessions as much as possible. Provided a given timetable and set of available vehicles, the number and duration of charge sessions that must be built into the schedule depends mostly on:

The resulting efficiency of the vehicle after considering the known operational conditions when creating the schedule The SoC safety threshold that is considered when creating the schedule The usable capacity of the battery for the vehicle when creating the schedule (function of the raw capacity of the battery, operational safety buffers applied, and known state-of-health SoH of the battery).

Therefore, the purpose of the method is to estimate in real-time if a bus can successfully complete the calculated schedule or not.

In this description, a daily schedule for a bus of the fleet is subdivided in activities.

An activity is a part of the schedule of a bus during a day. Therefore, an activity can be a trip or a journey (for instance the complete route of a bus line or a portion of the complete route, for example a portion between two stops), also called a journey-type activity, a charging session, an idle period, and also for instance a maintenance period, or any other operational timeframe of an electric bus during a day.

As an activity comprises different type of events the method must be able to also deal with a plurality of forecasting. In other words, for different types of activities, different ways of forecasting have been implemented.

For the vehicles in Service dashboard the following calculations are made so we can obtain the dynamically predicted SoC, for example as exposed below, in function of the associated attributes:

- Estimation of energy consumption during a non-charging activity, considering for example one or more of the following criteria: driver, vehicle type/vehicle, trip/terrain, distance travelled, idle time, weather, time of day, day of week, historical data, etc. This estimation is made for instance during a said journey-type activity
- Estimation of energy ingestion during a charging activity, considering for instance one or more of the following criteria: charger type, vehicle type, SoC at arrival, duration of the charging activity. This estimation is made for a charging activity, where the vehicle accumulate energy.

The estimation can consider more criteria like weather, usage limitations set forth by the manufacturer, etc.

But it is also needed to estimate net energy consumed during the day by:

- Chaining together a series of estimated driving activities and estimated charging activities to predict how "net energy consumed" will develop over the course of the operating day.
- Adjust the estimate "net energy consumed" and "SoC" based on real time SoC readings.

Indeed, after each activity made by the vehicle, the "net energy consumed" is calculated for the current and upcoming activities.

For instance, at the beginning of the day, we calculate the SoC for each activity by:
  adding up all estimated consumptions from activity #1 up to that activity
  subtracting all estimated ingestions from activity #1 up to that activity
  assuming we will start activity #1 with 100%.

For example, at the start of each of the next activities (for instance here activity #3), we re-estimate SoC for each of the activities 3 and up by:
  adding up all estimated consumptions from activity #3 up to that activity
  subtracting all estimated ingestions from activity #3 up to that activity
  knowing that we have started activity #3 with whatever SoC was reported by the Vehicle.

We never look back at estimated consumption or estimated ingestion for activities already completed, but we depart from the actual SoC of the last activity completed.

This value is relevant to see the evolution of the energy consumption of the vehicle during the schedule.

When the schedule and all related activities are initially prepared the net energy consumed value is estimated for the end of each of the activities. This is called the Baseline Estimate. The Baseline Estimate assumes that the SoC will be 100% SoC at the start of the first activity of the day.

When the Vehicle starts an activity of the scheduled block, the "Net Energy Consumed" is estimated again for the end of this next activity and each of the upcoming activities of a block. This is called the Dynamic Estimate.

The Dynamic Estimate uses the actual SoC at the start of the next activity as a starting point.

The method according to the invention requires a database of historic data, for the journey-type activity efficiency.

In this embodiment of the invention this database is architected as a data cube. It is known in the field of computer science that a data-cube is a n-dimensional array intended for storing a high volume of data.

The data set of parameters comprises a set of relevant parameters for describing a journey activity and the conditions under which it was executed.

In the context of the present invention, to avoid any terminological confusion, the term "index" is used to refer to the performance index, or performance indicator, while the parameters are the entries of the data-cube search (sometimes called indexes in computer science vocabulary).

For instance, but in a non-limiting way, this set of parameters comprises the line, the connection, the estimated wind during the activity, the outside temperature, the driver style, the time of the day, the expected passenger numbers, and the day type. Alternatively, or in combination, this set of parameters may comprise vehicle type, a transportation line, the outside temperature, daytime, driver's performance or score, day type. Each set of data stored in the data cube is associated with a performance index, which will be the output of the query of the data cube.

The term "connection" refers to the journey between the start and end point of a line (Activity level journey) or to the journey between two bus stops (Step level journey).

In this invention we refer to the term journey as a certain distance traveled over a specific path. Usually, a journey is identified by a start and end location. However, in case of an activity level journey, the start and end location are not sufficient to describe it correctly.

Two busses travelling from one city to another city may follow different paths, depending on the line number and route number they are following. Therefore, an Activity Level journey is described by:
  start location
  end location
  line number
  route number At a Step Level, a journey is identified by just the start location and the end location.

The Connection is one of the parameters (or dimensions of the cube) that is used to organize data in the cube. Others are, as mentioned, for example Vehicle Type, Temperature, Driver Score, Time of Day, etc.

In this embodiment of this invention, the performance index is a couple of values: distance and kWh estimation, allowing to calculate the efficiency number, which is dimensioned as kWh/km or miles/kWh.

In other words, in this embodiment of the invention, per data cell in the cube, we store the total number of kilometers and the total amount of energy used (for trips performed under those exact same conditions), and we calculate the efficiency (e.g., kWh/km) when we need it. This allows us to add additional data to already populated cells without having to go through all the historic data again.

The performance index stored in the data cube could also be alternatively the efficiency number itself, instead of the couple of values distance and kWh estimation. However, it is preferable to store the values of distance and energy separated rather than combined, as they can also be used separately.

Indeed, the purpose of storing these values, rather than the efficiency, is twofold:
- It allows us to add data to an already populated cell in the cube,
- It allows us to calculate the weighted average over multiple cells.

It must be noted that we store the number of actual activities performed that have contributed to the data found in a cell. This tells us something about the trustworthiness of the data.

This date cube is filled with historical data created from previous journey-type activities, comprising the parameters that applied at the start of the activity and associated with the distance travelled during the activity and the energy consumed, in kWh.

When a journey-type activity is made, for any kind of bus and at any moment of the day, the data cube is enhanced 30 with the data of that activity. Therefore, the data cube is permanently growing.

However, it could also be possible to manage and enhance the data cube in a more sporadic manner, for instance spaced from a plurality of days or weeks, with a preliminary check of the data added, to ensure that the data added are not adding irrelevant values.

For instance, rather than rebuilding the cube in its entirety, we add data to the cube on a daily basis. Storing the total distance travelled and total energy used per cell allows us to do so.

In a preliminary step of the method 1, we load 10 into a data-cube a historical data set of parameters.

As it will be exposed later in the description, when the parameter is a numeric value, for instance an hour, a temperature, a number of passengers or a wind indication, the data cube does not store the value itself, but a range of values, also called a "bracket".

Indeed, for a parameter (or dimension) to be suitable as a cube parameter, it must be discrete and must have a limited set of possible values. If a parameter does not match these criteria, the chance of finding matches when querying the cube with a specific set of parameters are extremely small.

Line number is an attribute of a connection as defined previously. As such they are indirectly a parameter for the cube.

As already stated, the attributes must be discrete and have a limited set of values.

The "Vehicle Type" is an example of such a discrete parameter.

Temperature is an example of a non-discrete parameter. Therefore, a solution is to round the temperature to the closest integer value, but we would still get a wide range of possible values.

For instance, looking at temperature, 5° C. and 6° C. are in each other's proximity. So, a result obtained from trips executed at 5° C. still have some relevance when estimating a trip expected to happen at 6° C. So, we do not want to restrict the method by only looking at results obtained for exactly 5° C. when estimating a trip expected to happen at 6° C.

Therefore, a solution is to round the temperature to the closest integer value, but we would still get a wide range of possible values.

It is therefore also possible to divide the temperature by a predetermined integer, for example 5, and round to the closest integer value. This would give a smaller range of values.

For this purpose, we have chosen in this embodiment of the invention to divide the range of temperature, and other non-discrete parameters of the invention that we must deal with into temperature brackets.

When it comes to connections, there is no such thing as "proximity". Results obtained for connection 1234 are not more relevant for connection 1235 or 1233 than they are for connection 0000 or 9999. If we cannot find a perfect match using the connection number, the connection number must be ignored.

When adding efficiency data from a trip to the cube, we determine which bracket the temperature falls in and use the bracket id as parameter. The bracket id itself is meaningless, but it tells us if two trips fell into the same bracket, temperature wise.

Before each beginning of a journey-type activity 14 in the daily schedule, a set of operational attributes are acquired 16 for the upcoming activity.

In other words, we acquire 16 data attributes for any upcoming "journey type" activity to estimate the efficiency number of the bus for this activity.

These operational attributes are in this embodiment of the invention the connection, estimated wind during the journey, outside temperature, driver style, time of day, expected passenger numbers and day type.

The day type is defined as a numerical value related to the day of the week, as in 1 is Monday, 2 is Tuesday etc.

If some attributes are easy to acquire, for instance starting time, some attributes will need a connection to an outside source of data, like a weather data provider, for wind and temperature.

Some other attributes will also be predefined or calculated as expected passenger numbers and connection.

These operational attributes are converted 18 into brackets, also called range of values.

Converting the attributes into brackets allow for 'hits' to be made when looking up the results from new journeys taking place.

In the context of the invention the term "hit" is to be understood as a relevant result after a query in the data-cube.

For instance, the chances of finding another historical journey on a Tuesday that starts at 9:03 where the temperature is 17.2 degrees and the driver's efficiency score is 68.2 are slim. But it is likely that thousands of journeys have been recorded on a day between 07:00-9:00 where the temperature was between 15-20 degrees and the driver had an efficiency score of B.

Then, for each bus of the fleet, before a bus starts a journey-type activity, a query 20 is launched in the cube for a precise match of the whole set of converted attributes.

If the cube return does not return a relevant answer, a subset of attributes (and converted attributes) is selected 24, according to a predetermined priority pattern, and a new query 20 is launched.

For instance, the pattern is selected in a list as shown below, ordered from top priority to the lowest priority:

```
Connection, Vehicle Type, Line, Temperature, Time, Driver, Day type
Connection, Vehicle Type, Temperature, Time, Driver, Day type
Vehicle Type, Line, Temperature, Time, Driver, Day type
Connection, Vehicle Type, Temperature, Driver, Day type
Vehicle Type, Line, Temperature, Driver, Day type
Connection, Vehicle Type, Temperature, Day type
Vehicle Type, Line, Temperature, Day type
Vehicle Type, Temperature, Time, Driver, Day type
Vehicle Type, Temperature, Driver, Day type
Vehicle Type, Temperature, Day type
Connection, Vehicle Type, Day type
Vehicle Type, Line, Day type
Vehicle Type, Day type
Connection, Vehicle Type
Vehicle Type, Line
Vehicle Type
```

This operation is repeated until the query returns a "hit" (a value matching the query).

In the context of the invention, a hit is a result indicating whether the query has provided results or not, as well as the number of associated results.

In this embodiment the associated results of a hit comprise a list of couple of values (distance, kWh estimation), referred as the efficiency index.

Usually, a "hit" comprising a single associated result (a single couple of values) can be considered as not relevant. Therefore, only answers that obtain enough associated results to the hit will usually be used. A predetermined number is therefore define at this end, for instance a number of at least 50 results for a significant hit.

In the worst situation, if the data-cube does not provide any hit at the end of the reducing pattern, we would use the efficiency data also used by the planning tool, like Hastus®, as a fallback, and if that does not exist either, we will use a predetermined baseline value will be used.

However, given the large amount of data collected, it is unlikely that no answers will be returned by the data cube query at some point of the pattern.

In other words, the first rule incorporates all available parameters. So, a query using the first rule will return at most one cell.

This cell provides the following values (among others):
total energy used;
total distance driven;
number of trips contributing to the data in the cell; this number allowing to decide whether the data can be used or not.

Based on these values, the average efficiency index for trips contributing to that cell can be calculated at any time. But it is also saved in the cell itself, so we do not have to do that calculation at that moment.

The other rules do not incorporate all available parameters. So, a single query using one of the other rules will most likely bring back multiple cells. We must sum the total energy used from each of these cells as well as the total distance driven from each of these cells and divide these sums to get a weighted average efficiency over all of the cells returned. And this resulting number is used for the estimation. The stored efficiency value in each of the cells is no relevant here.

When the efficiency index is acquired, then the estimated State of Charge SoC is calculated.

To estimate such SoC, a model is implemented taking in consideration this efficiency number and parameters of the battery. Such model is usually known from the man skilled in the art.

That calculated "estimated end SoC for this Activity" is used to calculate the "estimated end SoC of the next Activity" and so on. All estimated end SoC values are then compared to the charge limit.

In this embodiment of the invention, this estimated SoC is compared with a first alert value, for instance 10% or 5%, and with the 0% limit, to update the battery indicator 316 as described previously in the "Vehicle in Service".

When, according to the Dynamic Estimation, the SoC is expected to drop below 5%, or 10%, during any of the upcoming activities, the battery symbol turns yellow.

When, according to the Dynamic Estimation, the SoC is expected to drop below 0% during any of the upcoming activities, the battery symbol turns red.

When the activity to start is a charging activity, another approach is used as it is not necessary to estimate this SoC based on historic data. Even if it could be a solution, it is more efficient to implement a charging model of the batteries to calculate the estimated SoC.

If for one or more vehicles the expected state of charge is lower than a predetermined state of charge limit, it is possible to recalculate an operation schedule at the beginning of the day. The operation schedule may be recalculated taking into account the expected state of charge of all the vehicles of the fleet and the state of charge necessary to perform of all the scheduled journeys, and for example:

Schedule another vehicle of the fleet to perform the journey initially planned for the vehicle having a too low predicted state of charge to perform its journey, Sending the vehicle having a too low predicted state of charge to perform its journey to a charging station or schedule this vehicle for another journey requiring less state of charge, Adjusting charging activities duration planned for the vehicle having a too low predicted state of charge in order to regain enough state of charge to perform its journey.

Such recalculation of the operation schedule can be performed at the beginning of the day, as previously described, and/or may be performed in real time for each vehicle of the fleet of vehicles after the beginning of the journeys of the vehicles. In such case, the steps of acquisition, conversion, launch of the query, calculation of the expected state of charge and comparison of this expected state of charge with a predetermined state of charge limit are reiterated in real time for each vehicle of the fleet during said at least one this journey, and the operation schedule may be recalculated taking into account the expected state of charge of all the vehicles of the fleet and the state of charge necessary to finish all the scheduled journeys, and for example:

Schedule another vehicle of the fleet to finish the journey of a vehicle having a too low predicted state of charge to finish its journey, Sending a vehicle having a too low predicted state of charge to finish its journey to a charging station or schedule this vehicle for another journey requiring less state of charge, Adjusting charging activities duration planned for the vehicle having a too low predicted state of charge in order to regain enough state of charge to perform its journey.

Such recalculation may also take into account the distance between the vehicles that will be interchanged, as this may have an impact on the predicted state of charge.

Being able to predict the effect of changes in operational conditions on the SoC of vehicles in service, operators can mitigate potential problems at an early stage. This reduces the number of failed journeys in the current operation that impact the public's travel experience and provides confidence to create more efficient schedules that use less conservative efficiency rates.

These schedules with lower SoC safety margins for future operation reduce the number of vehicles required. This leads to less kilometers driven and subsequently less energy used as well as less embedded carbon emissions from new vehicles if the current fleet can be used elsewhere.

The method according to the invention is also relevant to improve scheduling and charging sessions.

Indeed, an important objective in the energy management of a fleet of electric bus is to limit the energy demand peak at the charging depots.

When the charging depots are not limited in demand, they can for instance provide 1130 kW at their peak, allowing almost every vehicle of the fleet to get the required SoC, but such peak should be avoided.

However, when it comes to reduce the electric demand peak, for instance at 800 kW, in an unmanaged way, then a high percentage of vehicles (in our test about 20%) will be in a situation where they will fail to make the schedule, because of a non-completed charging session.

We could observe that using our dynamic estimation method to calculate the schedules and organize the charging sessions over the days, allows to limit the electric demand peak at 800 kw, with the same success rate than when there is no limit in the unmanaged way.

As already explained, the Energy Demand in kWh is equal to the Net Energy Consumption at the end of the last non charging activity before each charge activity in each of the vehicle blocks that are generated by the planning or scheduling tool.

Therefore, we can visualize what the power drawn over the day will be when we let the vehicles charge unmanaged, from the moment they arrive at the charge locations, versus what it will be when we limit the maximum charge current.

We can produce a table of charging session requirements using the blocks of vehicles scheduled for the current day (as shown on the in-service vehicle table) and use the net energy consumed from the baseline estimate, i.e., at the beginning of the day, or the dynamic estimate, i.e., during the day, to calculate the energy demand for each charging session.

This will allow us to see what the maximum energy consumption would be, in an unmanaged load with unlimited grid capacity, or how many outages we might have, in a managed load with limited grid capacity.

The invention claimed is:

1. Computer-implemented method for optimizing energy management of a fleet of electric transportation vehicles comprising:
    providing an operation schedule for a given timeframe; said operation schedule comprising for each vehicle a plurality of activities to complete, said plurality of activities comprising at least one journey;
    providing a database of historic data; said historic data being configured to associate at least one performance index, with a set of a plurality of data attributes including vehicle type, a transportation line, outside temperature, daytime, driver's performance, and/or day type; said performance index comprising an efficiency value or a couple of values of energy and distance;
    and for each vehicle of the fleet, before performing each of the said at least one journey of the schedule:
        acquiring a set of attributes for an upcoming journey, said set of attributes comprising the same attributes as the set of attributes of the provided historic data;
        converting at least one attributes of the set of attributes into a range of values; said range of values replacing said attribute in the set of attributes acquired;
        launching a query in said database in order to obtain at least one performance index the set of attributes of which matches with the set of attributes containing at least one of converted attributes;
        if said query returns at least one performance index, calculating an expected state of charge of the battery at the end of the upcoming journey;
        comparing said expected state of charge with a predetermined state of charge limit; and if said expected state of charge is lower than said predetermined state of charge limit, deliver a signal on a human-machine interface to signal a potential failure of said upcoming journey,
        based on the signal, an operator recalculates the operation schedule including one or more of the following:
            schedule another vehicle of the fleet to perform the journey initially planned for the vehicle having a too low predicted state of charge to perform its journey,
            send the vehicle having a too low predicted state of charge to perform its journey to a charging station or schedule this vehicle for another journey requiring less state of charge,
            adjust charging activities duration planned for the vehicle having a too low predicted state of charge in order to regain enough state of charge to perform its journey.

2. Computer-implemented method according to claim 1, wherein the historic data are stored in a data-cube.

3. Computer-implemented method according to claim 1, wherein if the query returns no answer, then the method comprises in a repetitive manner, until the query returns at least one performance index, a step of:
    reducing the number of attributes in the set of attributes, according to a predetermined pattern, and
    relaunch a query.

4. Computer-implemented method according to claim 1, wherein after an activity is completed by a vehicle, the database stores the activity distance and the energy consumed during the activity along with the set of attributes calculated before starting the activity.

5. Computer-implemented method according to claim 1, further comprising a step of recalculating the operation schedule of the fleet of electric transportation vehicles as a function of the expected state of charge of each vehicle of the fleet.

6. Computer-implemented method according to claim 1, wherein for each vehicle of the fleet, after the beginning of said at least one journey, the computer-implemented method reiterate in real time, the following steps:
    acquiring the set of attributes for the rest of the upcoming journey;
    converting at least one attributes of the set of attributes into a range of values; said range of values replacing said attribute in the set of attributes acquired;
    launching a query in said database in order to obtain at least one performance index the set of attributes of which matches with the set of attributes containing at least one of converted attributes;
    if said query returns at least one performance index, calculating an expected state of charge of the battery at the end of the upcoming journey;

comparing said expected state of charge with a predetermined state of charge limit; and if said expected state of charge is lower than said predetermined state of charge limit, deliver a signal on a human-machine interface to signal a potential failure of said rest of the upcoming journey, and recalculating the operation schedule of the fleet of electric transportation vehicles as a function of the expected state of charge of each vehicle of the fleet.

7. A graphical user interface for optimizing the energy management of a fleet of electric transportation vehicles, said interface comprising a list of vehicles of the electric vehicle fleet, each electric vehicle being associated with a plurality of intended activities;

each vehicle of the list comprising a battery indicator associated with vehicle, characterized in that the battery indicator is formed of an image representing the measured SoC of the battery and colorized in function of the estimated SoC at the end of the next scheduled activity, wherein said estimated SoC at the end of the next scheduled activity is calculated by the implementation of the method according to claim 1.

* * * * *